United States Patent
Höjner

(10) Patent No.: US 12,083,944 B2
(45) Date of Patent: Sep. 10, 2024

(54) CONTAINER CARRIER

(71) Applicant: Höjner Invest AB, Falkenberg (SE)

(72) Inventor: Andreas Höjner, Falkenberg (SE)

(73) Assignee: HÖJNER INVEST AB, Falkenberg (SE)

( * ) Notice: Subject to any disclaimer, the term of this patent is extended or adjusted under 35 U.S.C. 154(b) by 669 days.

(21) Appl. No.: 16/972,538

(22) PCT Filed: Jun. 7, 2019

(86) PCT No.: PCT/SE2019/050530
§ 371 (c)(1),
(2) Date: Dec. 4, 2020

(87) PCT Pub. No.: WO2019/236002
PCT Pub. Date: Dec. 12, 2019

(65) Prior Publication Data
US 2021/0237637 A1    Aug. 5, 2021

(30) Foreign Application Priority Data
Jun. 8, 2018  (SE) .................... 1850700-4

(51) Int. Cl.
*B60P 1/64* (2006.01)
*B62D 53/06* (2006.01)

(52) U.S. Cl.
CPC .......... *B60P 1/6463* (2013.01); *B62D 53/067* (2013.01)

(58) Field of Classification Search
CPC ..... B60P 1/6463; B62D 53/067; B62F 53/067
USPC ........................................................ 410/54
See application file for complete search history.

(56) References Cited

U.S. PATENT DOCUMENTS

| | | | |
|---|---|---|---|
| 2,835,504 A * | 5/1958 | Acker .................... | B60Q 1/305 280/407.1 |
| 3,374,010 A | 3/1968 | Crockett et al. | |
| 3,614,153 A | 10/1971 | Tantlinger et al. | |
| 3,892,323 A * | 7/1975 | Corompt ............... | B60P 1/6463 414/491 |
| 4,175,904 A * | 11/1979 | Airaksinen .......... | B60P 1/6463 414/469 |

(Continued)

FOREIGN PATENT DOCUMENTS

| | | | | |
|---|---|---|---|---|
| AU | 2019101091 A4 * | 10/2019 | | |
| CA | 1070268 A * | 1/1980 | ............ | B60P 1/6463 |

(Continued)

OTHER PUBLICATIONS

Early Development of Continuous Tracks, Texas Final Drive https://info.texasfinaldrive.com/shop-talk-blog/early-development-of-continuous-tracks (Year: 2019).*

(Continued)

*Primary Examiner* — Hilary L Gutman
(74) *Attorney, Agent, or Firm* — Knobbe, Martens, Olson & Bear, LLP

(57) ABSTRACT

A container carrier (1) comprises an elongate main frame (2). The main frame (2) comprises an articulating lifting apparatus (3). The carrier (1) further comprises a second elongate frame (10) slidably connected to the main frame (2) arranged such that one of the frames is slidably arranged within the other frame in the longitudinal direction. The relative position of the two frames (2, 10) is changeable between a retracted position and an extracted position.

13 Claims, 4 Drawing Sheets

(56) References Cited

U.S. PATENT DOCUMENTS

| | | | |
|---|---|---|---|
| 4,877,293 A | 10/1989 | French et al. | |
| 4,958,845 A * | 9/1990 | Parks | B62D 53/067 |
| | | | 280/407.1 |
| 5,067,740 A * | 11/1991 | Christenson | B62D 53/067 |
| | | | 280/405.1 |
| 5,803,699 A | 9/1998 | Pinkston | |
| 6,817,677 B1 * | 11/2004 | Beiler | B65F 3/26 |
| | | | 298/22 C |
| 6,817,825 B1 * | 11/2004 | O'Hagen | B60P 1/28 |
| | | | 414/494 |
| 7,568,881 B1 * | 8/2009 | Collins | B60P 1/6463 |
| | | | 414/346 |
| 7,950,675 B1 | 5/2011 | Quenzi et al. | |
| 11,117,629 B1 * | 9/2021 | Wessels | B62D 53/068 |
| 2004/0191038 A1 | 9/2004 | Lockamy et al. | |
| 2008/0056869 A1 | 3/2008 | Cullum et al. | |
| 2022/0063476 A1 * | 3/2022 | Granel | B60P 1/5485 |
| 2023/0331135 A1 * | 10/2023 | Leppiaho | B60P 1/5457 |

FOREIGN PATENT DOCUMENTS

| | | | | |
|---|---|---|---|---|
| DE | 4327432 A1 * | 2/1995 | | B60P 1/6418 |
| DE | 10145432 A1 | 3/2003 | | |
| EP | 3623262 A1 * | 3/2020 | | B62D 21/20 |
| EP | 3858714 A1 * | 8/2021 | | B62D 13/025 |
| EP | 3623262 B1 * | 8/2023 | | B62D 21/20 |
| EP | 3620327 B1 * | 9/2023 | | B60P 1/167 |
| FR | 1573597 A | 4/1969 | | |
| FR | 2578499 A1 * | 9/1986 | | |
| FR | 2586626 A1 * | 3/1987 | | |
| FR | 2902378 A1 * | 12/2007 | | B60P 1/6463 |
| FR | 2905641 A1 * | 3/2008 | | B60P 1/6463 |
| GB | 190703266 A * | 10/1907 | | |
| GB | 2462919 A | 3/2010 | | |
| IN | 202141043182 A * | 11/2021 | | |
| KR | 20110001254 U | 2/2011 | | |
| SE | 504726 C2 * | 4/1997 | | B60P 1/6454 |
| WO | WO-9625302 A1 * | 8/1996 | | B60P 1/54 |
| WO | 2008092206 A1 | 8/2008 | | |
| WO | WO-2008155471 A1 * | 12/2008 | | B60P 1/6463 |
| WO | 2009/019327 A1 | 12/2009 | | |

OTHER PUBLICATIONS

International Search Report for International Application No. PCT/SE2019/050530, dated Jul. 19, 2019 in 6 pages.

Written Opinion of the International Searching Authority for International Application No. PCT/SE2019/050530, dated Jul. 19, 2019 in 4 pages.

European Search Report issued for European Patent Application No. 19814730.8, dated Feb. 28, 2022 in 7 pages.

* cited by examiner

CONTAINER CARRIER

TECHNICAL FIELD

The present invention relates to a container carrier comprising an elongate main frame, the main frame comprising an articulating lifting apparatus.

BACKGROUND

Containers of the kind described above are common for carrying shorter containers, for instance 20 feet long containers. When it comes to longer containers like 40 feet containers, they have to be either loaded from the side by lifting arrangements arranged at the ends of the carrier or by a separate lifting arrangement. Of course, a separate lifting arrangement is not always available.

A drawback with a lifting arrangement that lifts the container sideways is that it is necessary to have space free on the side of the container or the carrier equally long or longer than the container that is also not always available.

A solution has also been suggested to overcome the above mentioned problems that uses a pivot frame with an arm and jib arm that is movable along the carrier in order to pull the container up on the carrier. However, this solution requires a fairly complicated device, i.e. a pivot frame movable along the carrier. The lifting arrangement is heavy in itself but having it movable along the carrier requires the moving arrangement to be of a stable construction and as a result, this will obviously add considerably to the weight.

SUMMARY

It is an object of the present disclosure to provide an improved container carrier to at least alleviate some of the above mentioned issues, a carrier as defined by the appended claims.

With the expression/word "container" is meant any kind of support with a floor that is possible to connect to from the short side with a hook or a frame element with twist and lock function, e.g. container, swap body or flat rack.

According to a first aspect of the present disclosure, a container carrier comprises an elongate main frame, the main frame comprises an articulating lifting apparatus. The carrier further comprises a second elongate frame slidably connected to the main frame arranged such that one of the frames is slidably arranged within the other frame in the longitudinal direction. The relative position of the two frames is changeable between a retracted position and an extracted position.

According to a further aspect of the present disclosure the relative position of the two frames is changeable between a retracted position where the two frames overlap by more than 50% of the length of the shortest frame and an extracted position where the two frames overlap by less than 50% of the length of the shortest frame.

The combination of the two frames being slidably arranged relative each other and the pivot frame with the arm and jib arm makes it possible for a carrier according to the disclosure to load a longer container on its own from the rear side of the carrier. The arrangement with two frames that are slidable relative each other is comparatively simple and stable without adding too much weight.

According to one further aspect of the present disclosure the carrier comprises a connector part at one end for connecting to a semi truck. The connector part could be any kind but preferably of standard construction to fit with the semi trucks on the market.

Preferably, the second frame comprises at least one wheel axle with wheels. Depending on what weight is carried the number of axles can of course be varied, i.e. the heavier the carried weight, the more axles and/or wheels. An alternative to wheels could be for instance skids, the same principle with the two frames would still apply.

According to an alternative aspect of the container carrier according to the present disclosure, the second frame comprises at least a second wheel axle with wheels and a continuous track on each side of the frame. Continuous track, also called tank tread or caterpillar track, is a system of vehicle propulsion in which a continuous band of treads or track plates is driven by two or more wheels. The band is typically made of modular steel plates in the case of heavy equipment, or synthetic rubber reinforced with steel wires in the case of lighter vehicles.

The large surface area of the tracks distributes the weight better than rubber tires on an equivalent vehicle, enabling a continuous tracked carrier to traverse soft ground with less likelihood of becoming stuck due to sinking. The prominent treads of the metal plates are both hard-wearing and damage resistant, especially in comparison to rubber tires. The aggressive treads of the tracks provide good traction in soft surfaces but can damage paved surfaces, so some metal tracks can have rubber pads installed for use on paved surfaces.

Continuous tracks are today commonly used on a variety of contexts including bulldozers, excavators, tanks, and tractors, but can be found on any vehicle used in an application that can benefit from the added traction, low ground pressure and durability inherent in continuous track propulsion systems.

According to one alternative aspect of the present disclosure, both the frames each comprises a wheel axle with wheels and the main frame comprises an engine for powering the driving of the container carrier. A specially designed container carrier could thus be used without a semi truck to pull it, for instance with a built on truck cab.

An alternative to a truck cab is to have a control unit for remote controlling the container carrier, i.e. an autonomous drive container carrier. A combination, i.e. a truck cab and a self driving unit would also work.

Further, according to one aspect of the container carrier with an engine, the engine is an electric engine. This is especially advantageous when used in a limited cargo area with benefits as regards noise, no exhaust, and of course never being far away for charging the batteries.

According to another aspect of the present disclosure the container carrier further comprises a hydraulic system for actuating the extraction and retraction of the second frame. Thus, when a container is lifted by the jib arm to a specific position, an alternative is to extract the second frame underneath the container and thereby "lifting" it up on the carrier. When unloading the container the second frame is instead retracted to let one end of the container eventually come into contact with the surface the carrier is standing on.

An alternative to a system with hydraulics or any system for effectuating the extraction or retraction of the second frame with the second frame moving in relation to the surface is to have the main frame move relative the surface upon which the container carrier stands. According to one aspect of the present disclosure the container carrier comprises a connector part at one end for connecting to a semi truck and wherein the second frame comprises at least one wheel axle with wheels comprising a brake system separately controllable from the brake system of a connected semi truck.

Loading a container on a carrier in this way by using the brakes of the carrier would be by first lifting the container with the jib arm. At a certain position, the brakes on the second frame would be applied and the semi truck by moving forwards would pull the main frame forwards and thus pulling the container up on the carrier and extracting the second frame relative the main frame. Unloading the container is done by activating the breaks on the wheels of the second frame and then reversing the main frame via the semi truck and thus retracting the second frame relative the main frame.

According to a further aspect of the present disclosure, the lifting apparatus comprises a pivot frame with one end pivotally connected to the main frame. The pivot frame includes an arm that at a first end is pivotally movably attached with respect to the pivot frame. The second end of the arm has a movably attached jib arm with a hook member at the outermost end of the jib arm.

Further, according to an aspect of the present disclosure, the articulating lifting apparatus comprises a container attachment member. According to one alternative aspect, the attachment member is a hook and according to another alternative aspect, the attachment member is an attachment frame.

Further features of, and advantages with, the present invention will become apparent when studying the appended claims and the following description. The skilled person realize that different features of the present invention may be combined to create embodiments other than those described in the following, without departing from the scope of the present invention. For instance, extraction and retraction of the second frame may be carried out using another system than a hydraulic system. An example is a system utilizing electric motors and pinion racks.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1A:
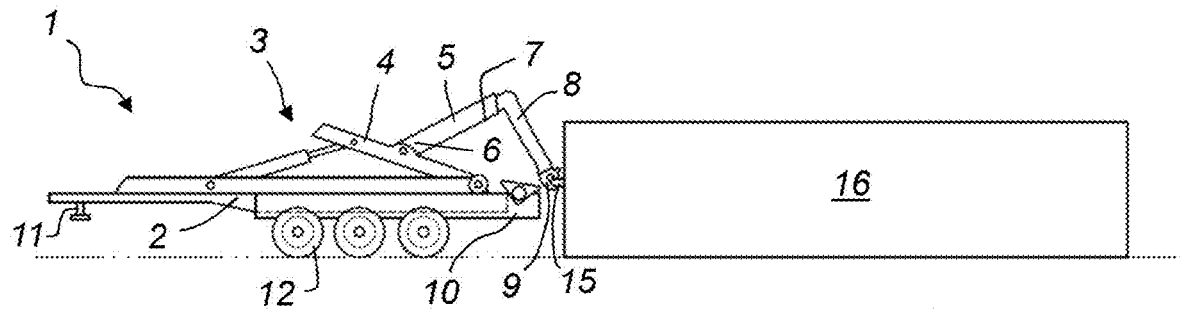
FIGS. 1a-1d show from the side in sequence the loading of a container onto a container carrier according to the disclosure.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1a a container carrier 1 is shown that comprises an elongate main frame 2. The main frame 2 comprises an articulating hook lifting apparatus 3 and the apparatus 3 comprises a pivot frame 4 with one end pivotally connected to the main frame 2. The pivot frame 4 includes an arm 5 that at a first end 6 is pivotally movably attached with respect to the pivot frame 4, the second end 7 of the arm 5 having a movably attached jib arm 8 with a hook member 9 at the outermost end of the jib arm 8. A second elongate frame 10 slidably connected to the main frame 2 arranged such that the main frame 2 is slidably arranged within the second frame 10 in the longitudinal direction. The main frame 2 is in FIG. 1a in a fully retracted position relative the second frame 10.

Also shown is a connector part 11 at one end for connecting to a semi truck. Further, the second frame 10 comprises three wheel axles with wheels 12.

Starting from FIG. 1a the jib arm 8 with its hook 9 is connected to the grip part 15 of the container 16. The lifting apparatus 3 is in a position where the pivot frame 4 is slightly raised at one end and the arm 5 is angled rearwards relative the pivot frame 4.

Figure 1B:
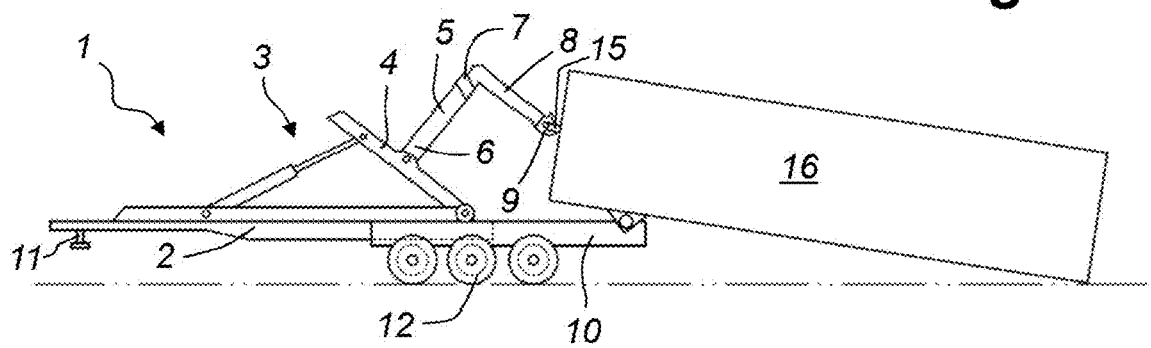
Figure 1C:
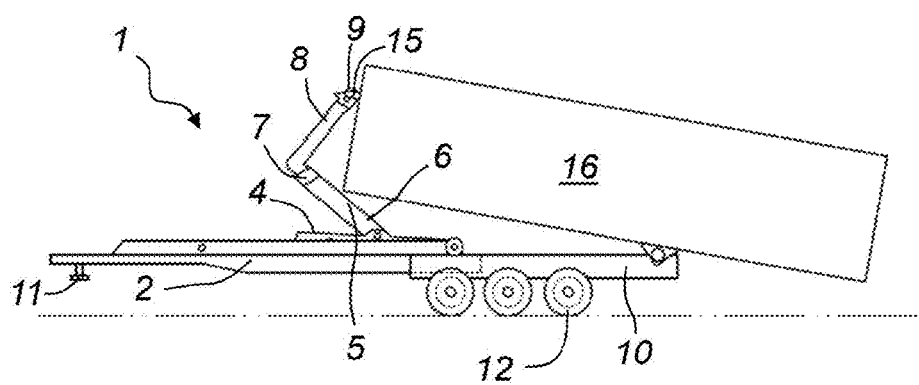

In FIG. 1b the pivot frame 4 has been raised slightly higher together with the arm 5 being perpendicular to the pivot frame 4. Also, the second frame 10 has been somewhat extracted and moved underneath a part of the container 16. In FIG. 1c the next step is shown where the second frame 10 is even further extracted, the pivot frame 4 almost parallel with the main frame 2 and the arm 5 of the pivot frame 4 in an angle slightly forward.

Figure 1D:
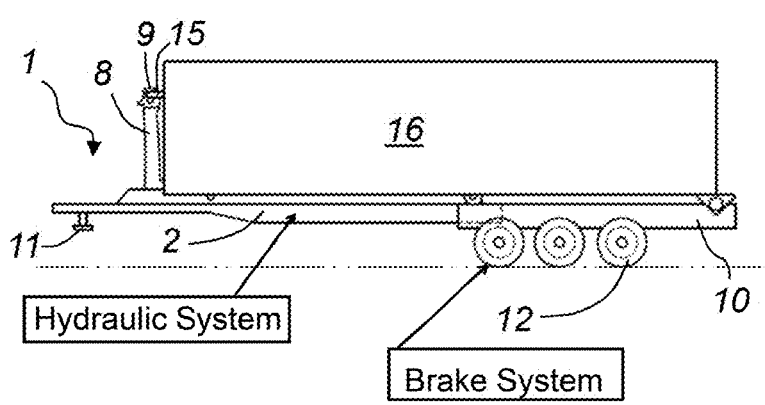

In FIG. 1d, the container 16 is fully loaded onto the container carrier 1. The arm 5 connected to the pivot frame 4 is parallel with the pivot frame 4 and the jib arm 8 is extracted from the arm 5. Also, the second frame 10 is further extracted as compared to the position shown in FIG. 1c.

Unloading the container 16, the same procedure as described above is performed in reverse order.

The loading and unloading of the container 16 can be done in two various ways or possibly a combination of these two ways. A first alternative is that the container carrier comprises a hydraulic system for actuating the extraction and retraction of the second frame 10. Thus, when loading the container 16 onto the carrier 1, the second frame 10 is extracted/pushed backwards underneath the container as seen in the sequence as shown in FIGS. 1a-1d. Unloading the container 1 is the same procedure but in reverse order as shown in the FIGS. 1d-1a (going from bottom to top), i.e. retracting the second frame 10.

A second alternative involves the carrier 1 having a connector part 11 at one end for connecting to a semi truck and wherein the second frame 10 comprises at least one wheel axle with wheels 12 with a separately controllable brake system, i.e. separate from the braking of the semi truck. The loading of the container follows the same principle as far as the relative positions of the main frame 2 and the second frame 10 is concerned. What differs is the way of extraction and retraction. In this second alternative the brakes are applied on the wheels 12 of the second frame 10. The semi truck is moved forward and thus pulls the main frame 2 from the second frame 10.

The difference between these two alternatives could be explained as what frame is moving relative the surface the carrier stands on.

Figure 2A:
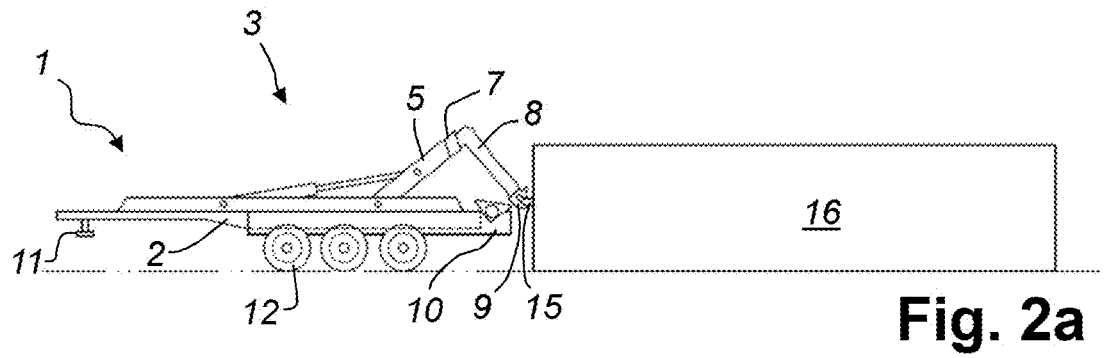
FIGS. 2a-2d show from the side in sequence the loading of a container onto a container carrier according to an alternative solution of the disclosure.

With reference to FIG. 2a a container carrier 1 is shown that comprises an elongate main frame 2. The main frame 2 comprises an articulating lifting apparatus 3 and the apparatus 3 comprises an arm 5 that is pivotally attached to the main frame 2. The distal end of the arm 5 has a movably attached jib arm 8 with a hook member 9 at the outermost end of the jib arm 8. A second elongate frame 10 slidably connected to the main frame 2 arranged such that the main frame 2 is slidably arranged within the second frame 10 in the longitudinal direction. The main frame 2 is in FIG. 2a in a fully retracted position relative the second frame 10.

Also shown is a connector part 11 at one end for connecting to a semi truck. Further, the second frame 10 comprises three wheel axles with wheels 12.

Starting from FIG. 2a the jib arm 8 with its hook 9 is connected to the grip part 15 of the container 16. The lifting apparatus 3 is in a position where the arm 5 is angled rearwards.

Figure 2B:
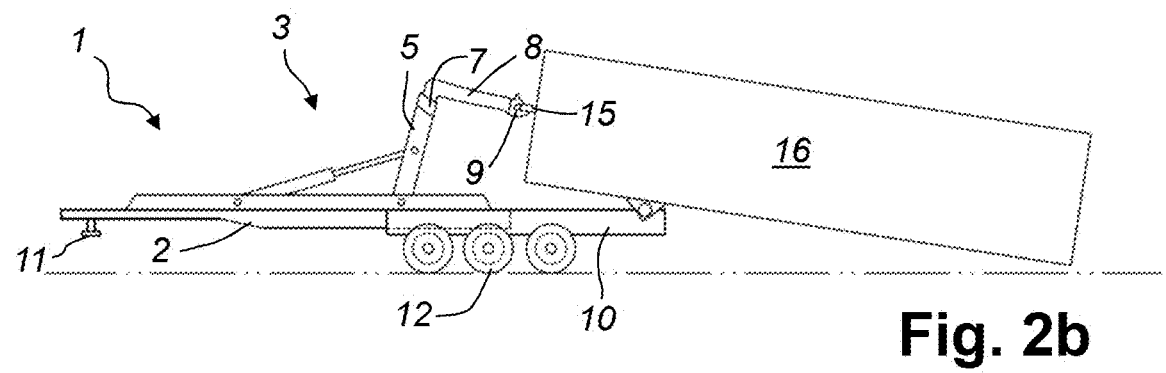
Figure 2C:
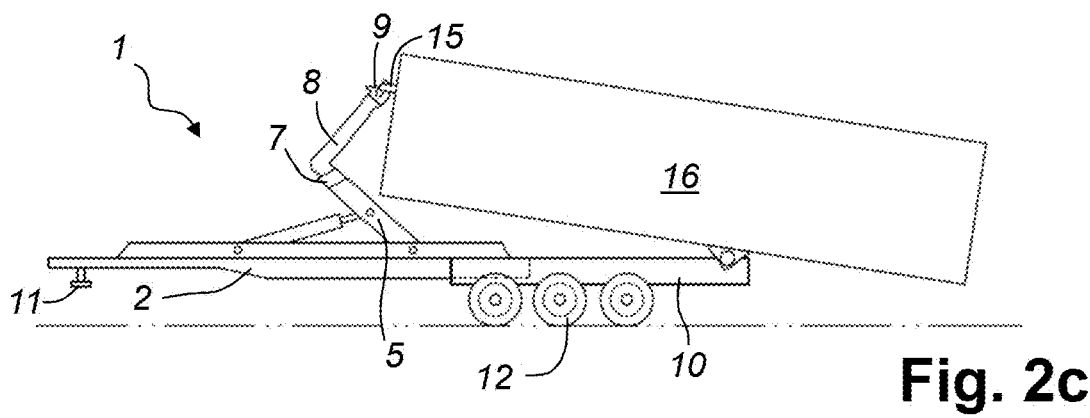

In FIG. 2b the arm 5 is angled almost vertically. Also, the second frame 10 has been somewhat extracted and moved underneath a part of the container 16. In FIG. 2c the next step is shown where the second frame 10 is even further extracted.

Figure 2D:
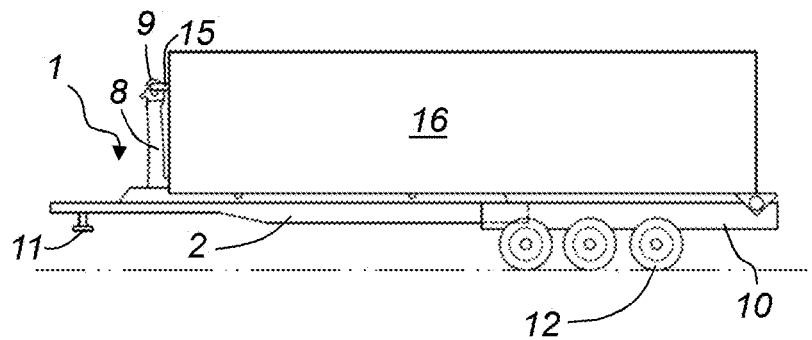

In FIG. 2d, the container 16 is fully loaded onto the container carrier 1. The arm 5 is parallel with the main frame 2 and the jib arm 8 is extracted from the arm 5. Also, the second frame 10 is further extracted as compared to the position shown in FIG. 1c.

Unloading the container 16, the same procedure as described above is performed in reverse order.

The loading and unloading of the container 16 can be done in two various ways or possibly a combination of these two ways. A first alternative is that the container carrier comprises a hydraulic system for actuating the extraction and retraction of the second frame 10. Thus, when loading the container 16 onto the carrier 1, the second frame 10 is extracted/pushed backwards underneath the container as seen in the sequence as shown in FIGS. 2a-2d. Unloading the container 1 is the same procedure but in reverse order as shown in the FIGS. 2d-2a (going from bottom to top), i.e. retracting the second frame 10.

A second alternative involves the carrier 1 having a connector part 11 at one end for connecting to a semi truck and wherein the second frame 10 comprises at least one wheel axle with wheels 12 with a separately controllable brake system, i.e. separate from the braking of the semi truck. The loading of the container follows the same principle as far as the relative positions of the main frame 2 and the second frame 10 is concerned. What differs is the way of extraction and retraction. In this second alternative the brakes are applied on the wheels 12 of the second frame 10. The semi truck is moved forward and thus pulls the main frame 2 from the second frame 10.

The difference between these two alternatives could be explained as what frame is moving relative the surface the carrier stands on.

Figure 3:
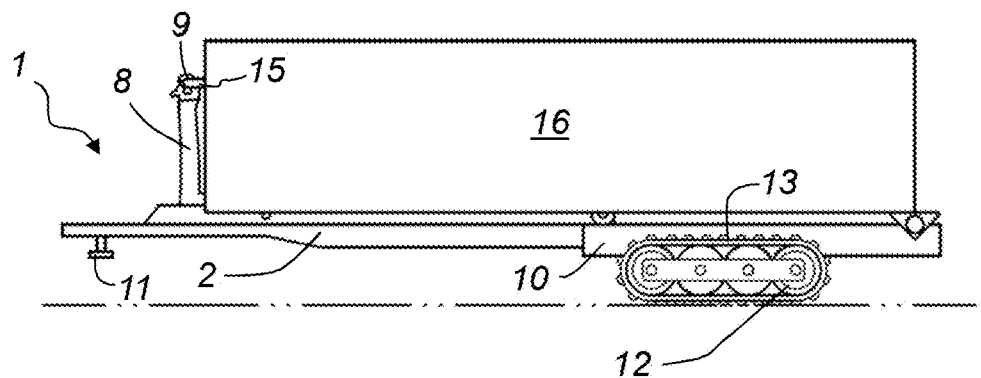
FIG. 3 is a side view of a container carrier according to the disclosure with continuous track.

Moving to FIG. 3, the container carrier 1 is equipped with continuous track 13. As stated previously, continuous track, also called tank tread or caterpillar track, is a system of vehicle propulsion in which a continuous band of treads or track plates is driven by two or more wheels. The band is typically made of modular steel plates in the case of heavy equipment, or synthetic rubber reinforced with steel wires in the case of lighter vehicles.

The large surface area of the tracks distributes the weight better than rubber tires on an equivalent vehicle, enabling a continuous tracked carrier to traverse soft ground with less likelihood of becoming stuck due to sinking. The prominent treads of the metal plates are both hard-wearing and damage resistant, especially in comparison to rubber tires. The aggressive treads of the tracks provide good traction in soft surfaces but can damage paved surfaces, so some metal tracks can have rubber pads installed for use on paved surfaces.

Continuous tracks are today commonly used on a variety of contexts including bulldozers, excavators, tanks, and tractors, but can be found on any vehicle used in an application that can benefit from the added traction, low ground pressure and durability inherent in continuous track propulsion systems. For the purpose of the present disclosure the semi truck pulling the container carrier 1 with continuous track 13 is preferably equipped as well with continuous track.

Figure 4:
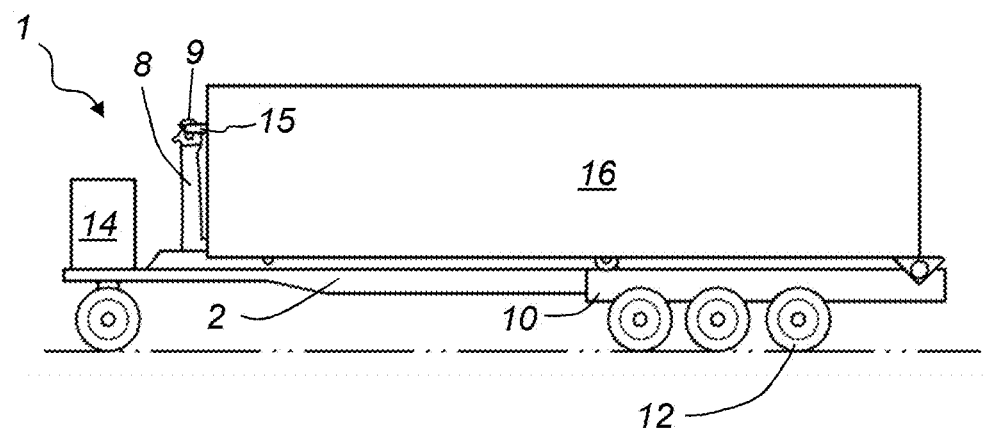
FIG. 4 is a side view of a container carrier according to the disclosure with an engine.

In FIG. 4, an embodiment of the present disclosure is shown of a container carrier 1 with an engine 14. The engine could be electric or an ICE. According to one aspect, the container carrier 1 is an autonomous vehicle. However, several steps are possible between the container carrier 1 of FIG. 1 and this one in FIG. 4. One example would be to have the carrier remote controlled by someone overseeing the loading or unloading.

Figure 5:
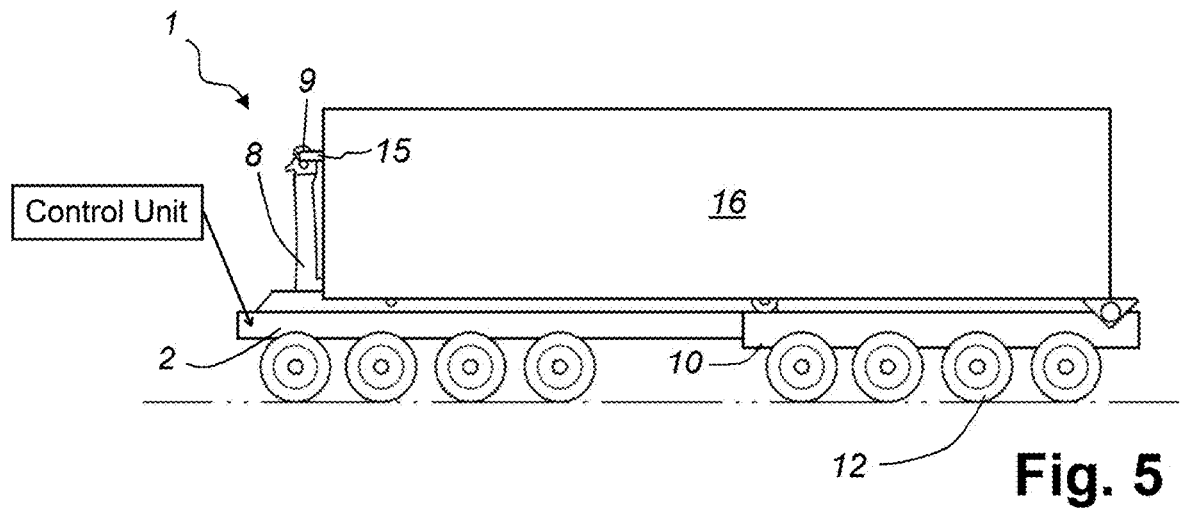
FIG. 5 is a side view of a container carrier driverless container carrier according to the present disclosure.

In FIG. 5, the container carrier 1 shown is an alternative to the one shown in FIG. 4. A control unit and a battery pack is built into one of the frames (2, 10) in order to minimize the total length of the carrier. Further, in order to be able to carry a heavy load, the container could be equipped with further wheel axles with wheels 12.

Figure 6:
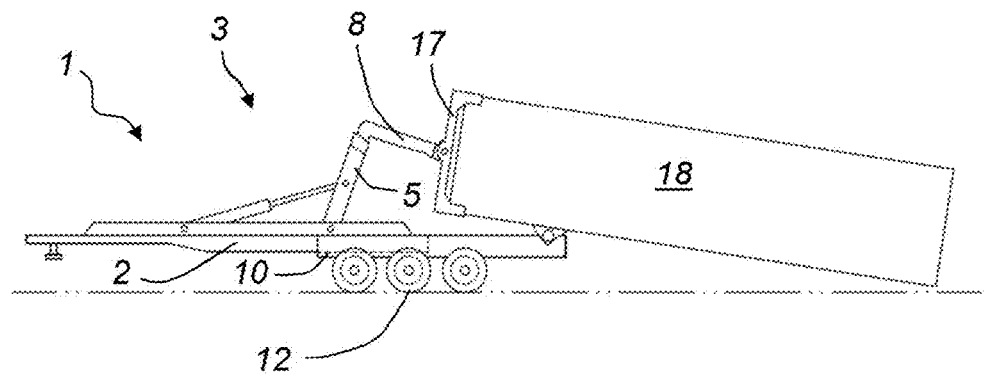
FIG. 6 is a side view of the container carrier shown in FIGS. 2a-2d equipped with an adapter for sea containers.

A further possibility is to use a hook lift for ISO containers, see FIG. 6. These lifts are used for lifting a container where the container has no bar for attaching a hook, i.e. the hook lift functions as an adapter. An adapter/attachment frame 17 is picked up by for instance an hydraulically adjustable vertical hook arm and moved backwards/down in order to be manually connected with frontal locks of a sea container 18.

It is to be understood that the present invention is not limited to the embodiments described above and illustrated in the drawings; rather, the skilled person will recognize that many changes and modifications may be made within the scope of the appended claims. For example, when loading and unloading the container the process could be combination of braking the wheels of the second frame and using a system for pushing the second frame to an extracted position or pulling the second frame to a retracted position. Another example is the attachment member, the frame 17 shown in FIG. 6 could be used in the other embodiments shown in FIGS. 1 to 5.

The invention claimed is:

1. A container carrier comprising an elongate main frame, the main frame comprising an articulating lifting apparatus, the carrier further comprises a second elongate frame slidably connected to the main frame arranged such that one of the frames is slidably arranged within the other frame in the longitudinal direction and such that the relative position of the two frames is changeable between a retracted position and an extracted position, wherein the second elongate frame comprises at least one wheel axle with wheels, and wherein the second elongate frame is configured to extend underneath a container such that the container is loaded on a top surface of the second elongate frame in the extracted position, wherein the container carrier further comprises an arm connected to the elongate main frame, wherein the arm is configured to pull up the container on a top surface of the elongate main frame and the top surface of the second elongate frame in the extracted position.

2. The container carrier according to claim 1, further comprising a connector part at one end for connecting to a semi-truck.

3. The container carrier according to claim 1, wherein the second elongate frame comprises at least a second wheel axle with wheels and a continuous track on each side of the frame.

4. The container carrier according to claim 1, wherein the frames each comprises a wheel axle with wheels and the main frame comprises an engine for powering the driving of the container carrier.

5. The container carrier according to claim 4, further comprising a control unit for remote controlling the container carrier.

6. The container carrier according to claim 4, wherein the engine is an electric engine.

7. The container carrier according to claim 1, further comprising a hydraulic system for actuating the extraction and retraction of the second elongate frame.

8. The container carrier according to claim 1, further comprising a connector part at one end for connecting to a semi-truck and wherein the second elongate frame comprises a brake system separately controllable from the brake system of the connected semi-truck.

9. The container carrier according to claim 1, wherein the relative position of the two frames is changeable between the retracted position where the two frames overlap by more than 50% of the length of the shortest frame and the extracted position where the two frames overlap by less than 50% of the length of the shortest frame.

10. The container carrier according to claim 1, wherein the lifting apparatus comprises a pivot frame with one end pivotally connected to the main frame, the pivot frame including the arm that at a first end is pivotally movably attached with respect to the pivot frame, a second end of the arm having a movably attached jib arm with a hook member at the outermost end of the jib arm.

11. The container carrier according to claim 1, wherein the articulating lifting apparatus comprises a container attachment member.

12. The container carrier according to claim 11, wherein the container attachment member is a hook.

13. The container carrier according to claim 11, wherein the container attachment member is an attachment frame.

\* \* \* \* \*